(12) United States Patent
Marri et al.

(10) Patent No.: US 12,210,424 B2
(45) Date of Patent: Jan. 28, 2025

(54) SYSTEM AND METHOD TO PERFORM A RESTORATION USING SNAPSHOT-BASED BACKUPS

(71) Applicant: Dell Products L.P., Round Rock, TX (US)

(72) Inventors: Srikanth Chowdary Marri, Bengalure (IN); Madhukar Shukla, Bangalore (IN); Elango Chockalingam, Bangalore (IN); Shivaraj Abbigeri, Karnataka (IN); Vibhanshu Rai, Azamgarh (IN)

(73) Assignee: DELL PRODUCTS L.P., Round Rock, TX (US)

( * ) Notice: Subject to any disclaimer, the term of this patent is extended or adjusted under 35 U.S.C. 154(b) by 102 days.

(21) Appl. No.: 18/159,463

(22) Filed: Jan. 25, 2023

(65) Prior Publication Data

US 2024/0248814 A1 Jul. 25, 2024

(51) Int. Cl.
  *G06F 11/14* (2006.01)
  *G06F 16/11* (2019.01)
(52) U.S. Cl.
  CPC ...... *G06F 11/1469* (2013.01); *G06F 11/1451* (2013.01); *G06F 16/122* (2019.01); *G06F 2201/84* (2013.01)
(58) Field of Classification Search
  None
  See application file for complete search history.

(56) References Cited

U.S. PATENT DOCUMENTS

| | | | |
|---|---|---|---|
| 8,266,112 B1* | 9/2012 | Beatty | G06F 11/1469 707/610 |
| 11,068,354 B1* | 7/2021 | Ugur-Ozekinci | G06F 11/1474 |
| 2007/0185922 A1* | 8/2007 | Kapoor | G06F 11/1469 |
| 2010/0198791 A1* | 8/2010 | Wu | G06F 11/1451 707/E17.007 |
| 2011/0153567 A1* | 6/2011 | Sawdon | G06F 11/1456 707/645 |
| 2013/0006945 A1* | 1/2013 | Prahlad | G06F 11/1464 707/674 |
| 2019/0095285 A1* | 3/2019 | McCormack | G06F 11/1451 |
| 2020/0026615 A1* | 1/2020 | Bagchi | G06F 11/1451 |

\* cited by examiner

*Primary Examiner* — Belix M Ortiz Ditren
(74) *Attorney, Agent, or Firm* — Chamberlain, Hrdlicka, White, Williams & Aughtry; Aly Dossa

(57) ABSTRACT

A method for performing a restore operation includes identifying a full backup associated with a first client device nearest a target restore time. The method further includes identifying a set of log backups that includes a first log backup that encompasses the target restore time and all log backups between the full backup and the first log backup. The method also includes identifying a target volume to which the full backup and all log backups are to be restored, and the target volume is on a second client device separate from the first client device. Moreover, the method includes restoring the full backup and the set of log backups to the target volume. In addition, the method includes mounting, after the restoring, the target volume to a target file system. Further, the method includes performing a native client restoration mechanism to the target restore time using the target file system.

17 Claims, 13 Drawing Sheets

SYSTEM AND METHOD TO PERFORM A RESTORATION USING SNAPSHOT-BASED BACKUPS

BACKGROUND

Computing devices often exist in environments that include many such devices (e.g., servers, virtualization environments, storage devices, network devices, etc.). Such environments may, from time to time, in whole or in part, require being twinned and/or migrated (e.g., moved from one set of devices to another). Such twinning and/or migrations often require large amounts of investigation, coordination, time, and manual steps to be performed by any number of system administrators.

SUMMARY

In general, embodiments described herein relate to a method for performing a restore operation. The method includes identifying a full backup associated with a first client device nearest a target restore time. The method further includes identifying a set of log backups that includes a first log backup that encompasses the target restore time and all log backups between the full backup and the first log backup. The method also includes identifying a target volume to which the full backup and all log backups are to be restored, and the target volume is on a second client device separate from the first client device. Moreover, the method includes restoring the full backup and the set of log backups to the target volume. In addition, the method includes mounting, after the restoring, the target volume to a target file system. Further, the method includes performing a native client restoration mechanism to the target restore time using the target file system.

In general, embodiments described herein relate to a system which includes a backup storage system that includes a backup agent configured to identify a full backup associated with a first client device nearest a target restore time. The backup agent is also configured to identify a set of log backups that includes a first log backup that encompasses the target restore time and all log backups between the full backup and the first log backup. Further, the backup agent is configured to identify a target volume to which the full backup and all log backups are to be restored, and the target volume is on a second client device separate from the first client device. Moreover, the backup agent is configured to restore the full backup and the set of log backups to the target volume. In addition, the backup agent is configured to mount, after the restoring, the target volume to a target file system. The system also includes the second client device operatively connected to the backup storage system, and the client device includes a client agent configured to perform a native client restoration mechanism to the target restore time using the target file system.

In general, embodiments described herein relate to a method for performing a restore operation. The method includes identifying a full backup associated with a first client device nearest a target restore time. The method further includes identifying a set of log backups that includes a first log backup that encompasses the target restore time and is linked to a second full backup and all log backups between the full backup and the first log backup. The method also includes identifying a target volume to which the full backup and all log backups are to be restored, and the target volume is on a second client device separate from the first client device. Moreover, the method includes restoring the full backup and the set of log backups to the target volume. In addition, the method includes mounting, after the restoring, the target volume to a target file system. Further, the method includes performing a native client restoration mechanism to the target restore time using the target file system, and the native client restoration mechanism Recovery Manager (RMAN).

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
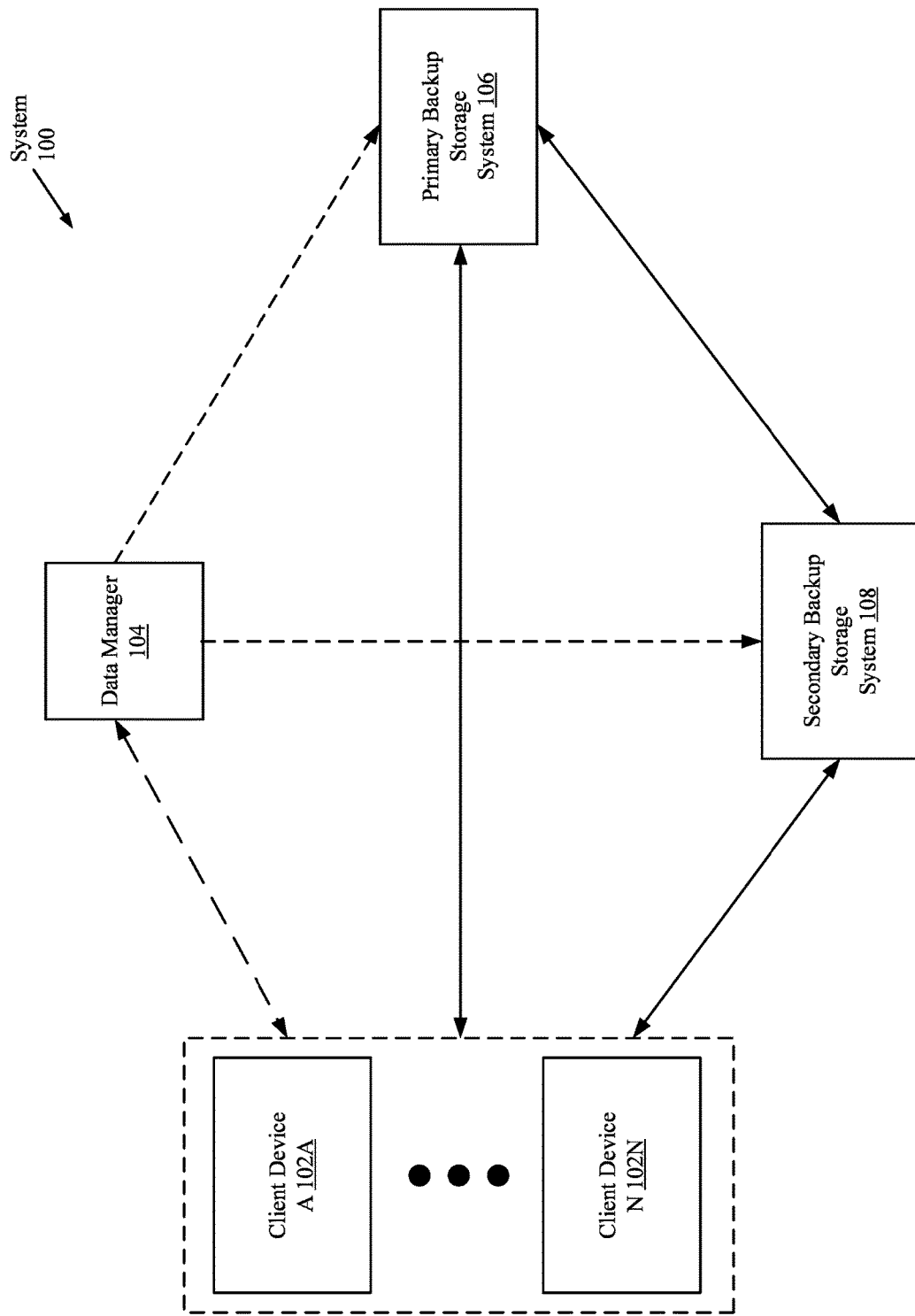
FIG. 1A shows a diagram of a system in accordance with one or more embodiments of the invention.

In the below description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

The following describes one or more embodiments.

FIG. 1A shows a diagram of a system in accordance with one or more embodiments described herein. The system (100) may include one or more client devices (102A-102N), a data manager (104), a primary backup storage system (106), and a secondary backup storage system (108). Each of these components is described below.

In one or more embodiments, the data manager (104) is operatively connected to the one or more client devices (102A-102N), the primary backup storage system (106), and the secondary backup storage system (108). The data manager (104) is configured to send control signals (indicated by the dashed lines) to perform various backup operations, as described in detail below. Further, the one or more client devices (102A-102N) are operatively connected to the primary backup storage system (106) and the secondary backup storage system (108). The clients (102A, 102N) are configured to exchange data (indicated by the solid lines) as part of backup operations, as described in detail below. Further, the primary backup storage system (106) and the secondary backup storage system (108) are operatively connected to each other and are each configured to exchange data (indicated by the solid lines) as part of backup operations, as described in detail below.

In one embodiment of the invention, the components may operatively connect to one another through a network (e.g., a local area network (LAN), a wide area network (WAN) such as the Internet, a mobile network, etc.). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, the components may communicate with one another using any combination of wired and/or wireless communication protocols.

In one embodiment of the invention, a client device (102A-102N) may represent any physical device or computing system designed and configured to receive, generate, process, store, and/or transmit digital data, as well as to provide an environment in which one or more computer programs may execute thereon. The computer programs (not shown) may, for example, implement large-scale and complex data processing; or implement one or more services offered locally or over the network. Further, in providing an execution environment for any computer programs installed thereon, a client device (102A-102N) may include and allocate various resources (e.g., computer processors, memory, storage, virtualization, network bandwidth, etc.), as needed, to the computer programs and the tasks (or processes) instantiated thereby. One of ordinary skill will appreciate that a client device (102A-102N) may perform other functionalities without departing from the scope of the invention.

Figure 9:
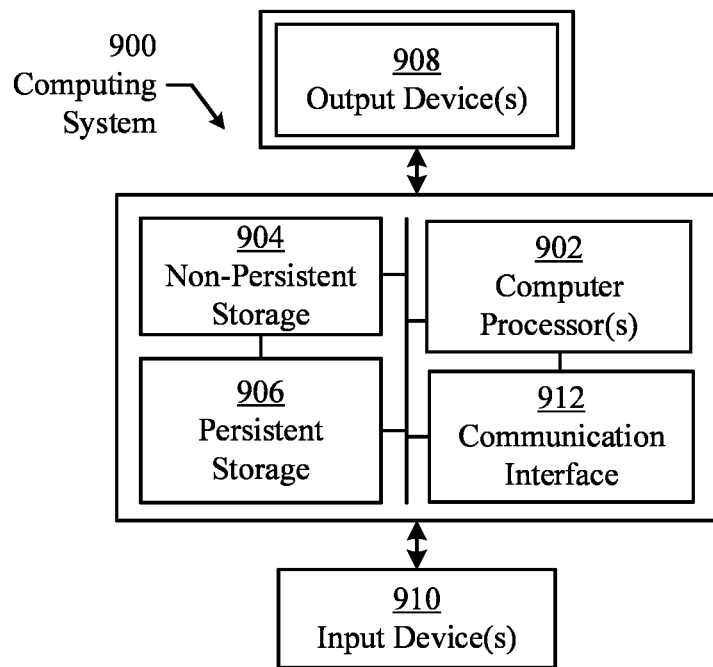
FIG. 9 shows a computing system in accordance with one or more embodiments of the invention.

Examples of a client device (102A-102N) may include, but are not limited to, a desktop computer, a laptop computer, a server, a mainframe, or any other computing system similar to the exemplary computing system shown in FIG. 9. Moreover, one embodiment of a client device (102A-102N) is described in further detail below with respect to FIG. 1B.

In one embodiment of the invention, the primary backup storage system (106) may represent a data backup, archiving, and/or disaster recovery storage system. The primary backup storage system (106) may be implemented using one or more servers (not shown). Each server may refer to a physical server, which may reside in a datacenter, or a virtual server, which may reside in a cloud computing environment. Additionally or alternatively, the primary backup storage system (106) may be implemented using one or more computing systems similar to the exemplary computing system shown in FIG. 9. One embodiment of the primary backup storage system (106) is described in further detail below with respect to FIG. 1C.

In one embodiment of the invention, the secondary backup storage system (108) may represent a data backup, archiving, and/or disaster recovery storage system. The secondary backup storage system (108) may be implemented using one or more servers (not shown). Each server may refer to a physical server, which may reside in a datacenter, or a virtual server, which may reside in a cloud computing environment. Additionally or alternatively, the secondary backup storage system (108) may be implemented using one or more computing systems similar to the exemplary computing system shown in FIG. 9. One embodiment of the secondary backup storage system (108) is described in further detail below with respect to FIG. 1D.

Figure 1B:
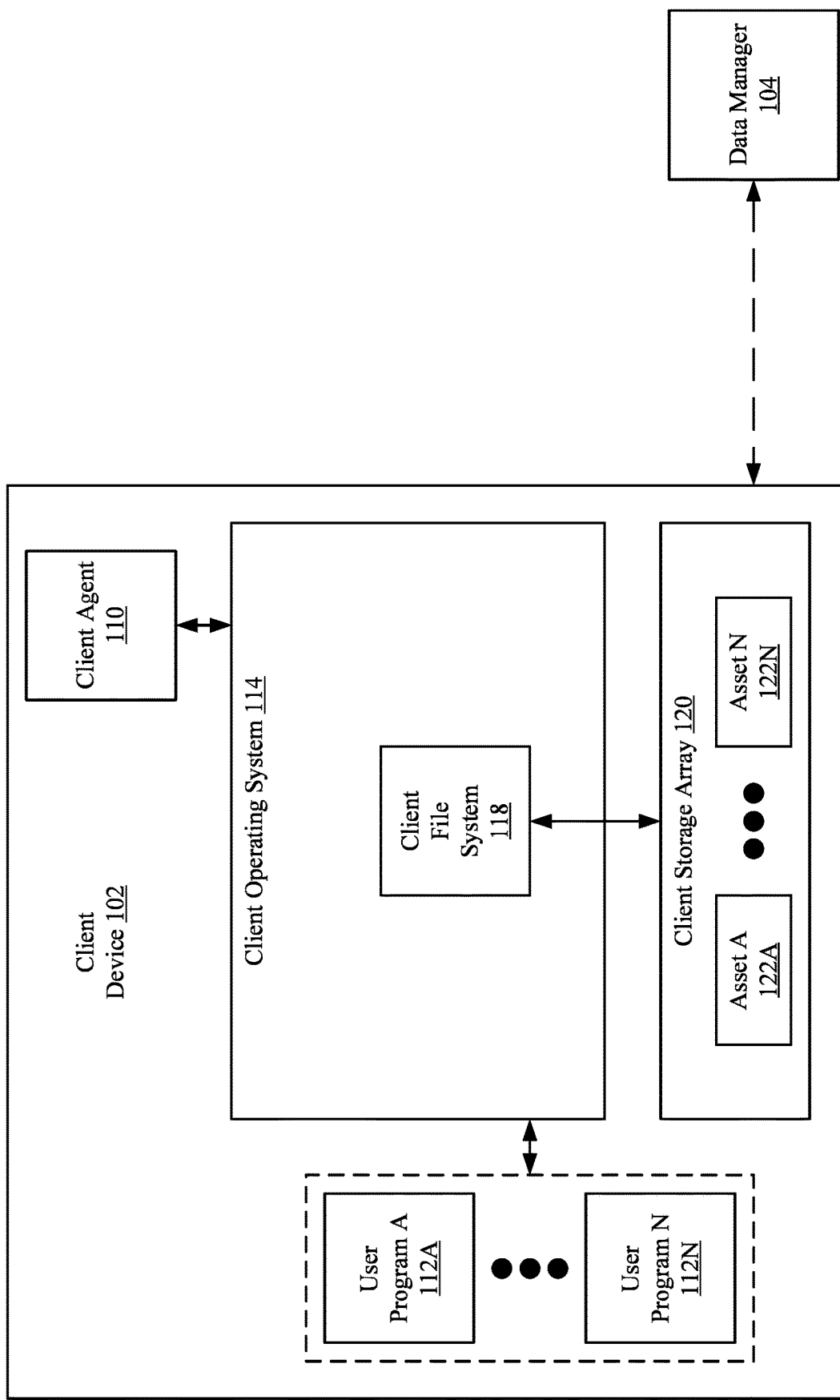
FIG. 1B shows a diagram of a client device in accordance with one or more embodiments of the invention.

FIG. 1B shows a client device in accordance with one or more embodiments of the invention. The client device (102) may include a client agent (110), one or more user programs (112A-112N), a client operating system (114), and a client storage array (120). Each of these client device (102) components is described below.

In one embodiment of the invention, the client agent (110) may refer to a computer program that may execute on the underlying hardware of the client device (102). Specifically, the client agent (110) may be designed and configured to perform client-side backup operations. To that extent, the client agent (110) may include functionality to perform the generation of archive log backups (described below) and to perform at least some restoration operations as described below in reference to FIGS. 6 and 7.

In one embodiment of the invention, a user program (112A-112N) may refer to a computer program that may execute on the underlying hardware of the client device (102). Specifically, a user program (112A-112N) may be designed and configured to perform one or more functions, tasks, and/or activities instantiated by a user of the client device (102). Accordingly, towards performing these operations, a user program (112A-112N) may include functionality to request and consume client device (102) resources (e.g., computer processors, memory, storage, virtualization, network bandwidth, etc.) by way of service calls to the client operating system (114). One of ordinary skill will appreciate that a user program (112A-112N) may perform other functionalities without departing from the scope of the invention. Examples of a user program (112A-112N) may include, but are not limited to, a word processor, an email client, a database client, a web browser, a media player, a file viewer, an image editor, a simulator, a computer game, or any other computer executable application.

In one embodiment of the invention, the client operating system (114) may refer to a computer program that may execute on the underlying hardware of the client device (102). Specifically, the client operating system (114) may be designed and configured to oversee client device (102) operations. To that extent, the client operating system (114) may include functionality to, for example, support fundamental client device (102) functions; schedule tasks; mediate interactivity between logical (e.g., software) and physical (e.g., hardware) client device (102) components; allocate client device (102) resources; and execute or invoke other computer programs executing on the client device (102). One of ordinary skill will appreciate that the client operating system (114) may perform other functionalities without departing from the scope of the invention.

For example, the client operating system (114) may facilitate user program (112A-112N) interaction with assets (126A-126N) stored locally on the client device (102) or remotely over a network. The client operating system (114) may facilitate management of the various accessible assets (122A-122N) stored locally on the client device (102) and/or remotely on one or more backup storage systems (106, 108).

In one embodiment of the invention, the client file system (118) may represent a physical file system (also referred to as a file system implementation). A physical file system may refer to a collection of subroutines concerned with the physical operation of one or more physical storage devices (described below). The client file system (118), in this respect, may be concerned with the physical operation of the client storage array (120). Accordingly, the client file system (118) may employ client storage array (120) device drivers (or firmware) to process requested file operations from the user program(s) (112A-112N). Device drivers enable the client file system (118) to manipulate physical storage or disk blocks as appropriate.

In one embodiment of the invention, the client storage array (120) may refer to a collection of one or more physical storage devices (not shown) on which various forms of digital data—e.g., one or more assets (122A-122N) (described below)—may be consolidated. Each physical storage device may encompass non-transitory computer readable storage media on which data may be stored in whole or in part, and temporarily or permanently. Further, each physical storage device may be designed and configured based on a common or different storage device technology—examples of which may include, but are not limited to, disk-based storage, flash based storage devices, fibre-channel (FC) based storage devices, serial-attached small computer system interface (SCSI) (SAS) based storage devices, and serial advanced technology attachment (SATA) storage devices. Moreover, any subset or all of the client storage array (120) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or more embodiments, the client device (102) may utilize Oracle© asset management solutions. For example, the client storage array (120) may utilize Automatic Storage Management (ASM) to manage various aspects of the client storage array (120). Further, the client agent (110) may utilize Recovery Manager (RMAN) to perform various backup and recovery tasks on the client device. For example, the client agent (110) may utilize RMAN to generate metadata associated with the asset (122A-122N), generate backup files of the asset (122A-122N), and perform portions of a recovery operation, as discussed in detail below. Those skilled in the art will appreciated that the invention is not limited to the aforementioned branded software products and/or components.

In one embodiment of the invention, an asset (122A-122N) may represent a database, or a logical container to and from which related digital data may be stored and retrieved, respectively. An asset (122A-122N) may occupy a portion of a physical storage device or, alternatively, may span across multiple physical storage devices, of the client storage array (120). Furthermore, an asset (122A-122N) may refer to a composite of various database objects including, but not limited to, one or more data files, one or more control files, and/or one or more redo log files (all not shown). Each of these asset (122A-122N) subcomponents is described below.

In one embodiment of the invention, a data file may refer to a database object for storing database data. Database data may encompass computer readable content (e.g., images, text, video, audio, machine code, any other form of computer readable content, or a combination thereof), which may be generated, interpreted, and/or processed by any given user program (112A-112N).

In one embodiment of the invention, a control file may refer to a database object for storing asset (122A-122N) metadata (also referred to as database metadata). Database metadata may encompass information descriptive of the database (or asset (122A-122N)) status and structure. By way of examples, database metadata may include, but are not limited to, a database name assigned to the asset (122A-

122N), the name(s) and storage location(s) of one or more data files and redo log files associated with the asset (122A-122N), a creation timestamp encoding the date and/or time marking the creation of the asset (122A-122N), a log sequence number associated with a current redo log file, etc.

In one embodiment of the invention, a redo log file may refer to a database object for storing a history of changes made to the database data. A redo log file may include one or more redo entries (or redo records), which may include a set of change vectors. Each change vector subsequently describes or represents a modification made to a single asset (122A-122N) data block. Furthermore, a redo log file may serve to recover the asset (122A-122N) should a failover occur, or to apply recent changes to a recovered asset (122A-122N) which may have transpired during the database recovery process.

In one or more embodiments, the data manager (104) may be operatively connected to the client device (102). In one or more embodiments, the data manager (104) may be operatively connected directly to the client storage array (120) of the client device (102). As such, the data manager (104) may communicate with the client storage array (120) without affecting the operations of the client operating system (114). Further, the operative connection between the data manager (104) and the client device (102) and/or client storage array (120) may facilitate a portion or all of the methods in FIGS. 2, 3, 4, 6, and/or 7.

While FIG. 1B shows a configuration of components, other client device (102) configurations may be used without departing from the scope of the invention.

Figure 1C:
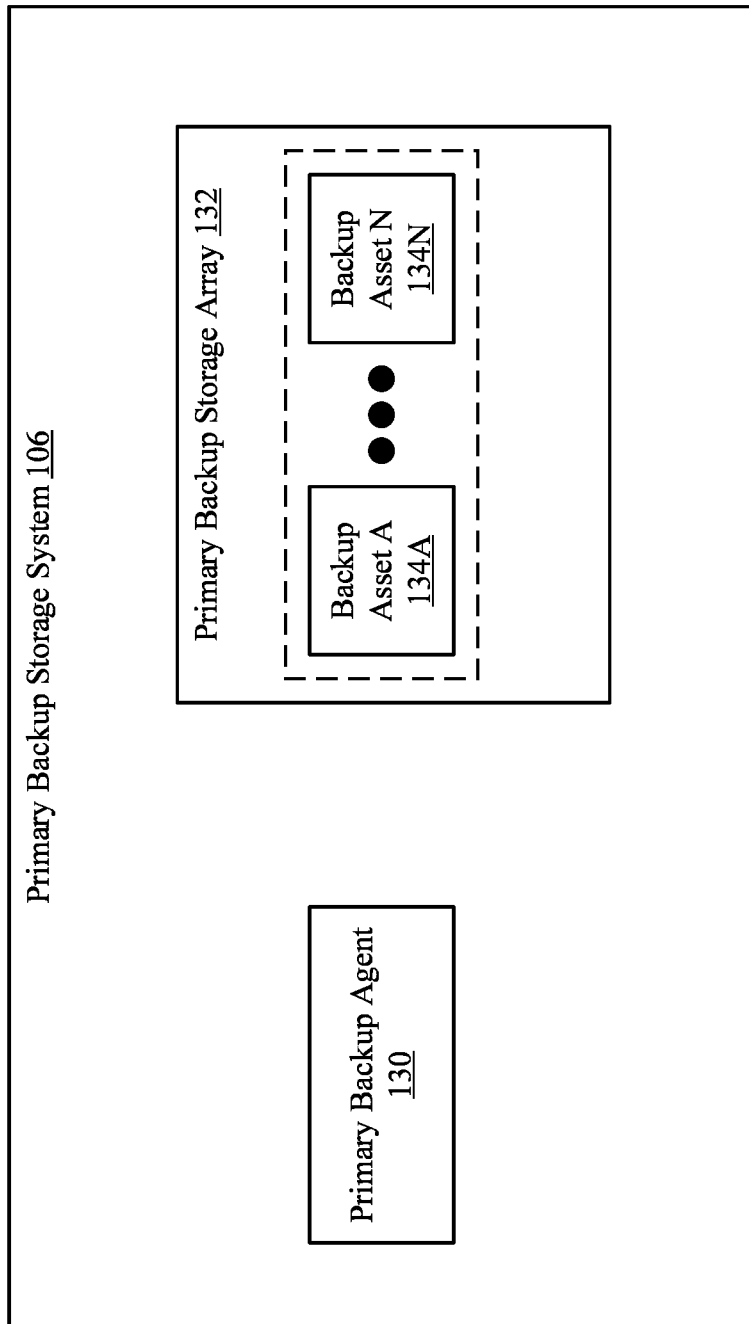
FIG. 1C shows a diagram of a primary backup storage system in accordance with one or more embodiments of the invention.

FIG. 1C shows a primary backup storage system in accordance with one or more embodiments of the invention. The primary backup storage system (106) may include a primary backup agent (130) and a primary backup storage array (132). Each of these primary backup storage system (106) components is described below.

In one embodiment of the invention, the primary backup agent (130) may refer to a computer program that may execute on the underlying hardware of the primary backup storage system (106). Specifically, the primary backup agent (130) may be designed and configured to perform backup operations such as snapshot-based backups and restoration operations. To that extent, the primary backup agent (130) may include functionality to perform a portion or all of the steps outlined below with respect to FIGS. 2, 3, 4, 6, and/or 7. One of ordinary skill will appreciate that the primary backup agent (130) may perform other functionalities without departing from the scope of the invention.

In one embodiment of the invention, the primary backup storage array (132) may refer to a collection of one or more physical storage devices (not shown) on which various forms of digital data—e.g., one or more backup assets (134A-134N) (described below)—may be consolidated. Each physical storage device may encompass non-transitory computer readable storage media on which data may be stored in whole or in part, and temporarily or permanently. Further, the physical storage devices may only include flash storage, examples of which may include devices using Non-Volatile Memory Express (NVMe) or over Fabric (NVMe-oF). In one embodiment of the invention, NVMe device is a persistent storage that includes SSD that is accessed using the NVMe® specification (which defines how applications communicate with SSD via a peripheral component interconnect express) bus. Further, the physical storage devices may include any enterprise-class solid state storage resources that provide very high storage bandwidth, low latency, and high input-outputs per second (IOPS).

In one embodiment of the invention, a backup asset (134A-134N) may refer to a backup copy of a given asset (122A-122N) (see e.g., FIG. 1). Accordingly, a backup asset (134A-134N) may similarly represent a database or a logical container to and from which related digital data, or any granularity thereof, may be stored and retrieved, respectively. A backup asset (134A-134N) may occupy a portion of a physical storage device or, alternatively, may span across multiple physical storage devices, of the primary backup storage array (132). Furthermore, similar to an asset (122A-122N), a backup asset (134A-134N) may refer to a composite of various database objects including, but not limited to, one or more data files, one or more control files, and/or one or more redo log files (all described above).

While FIG. 1C shows a configuration of components, other primary backup storage system (106) configurations may be used without departing from the scope of the invention.

Figure 1D:
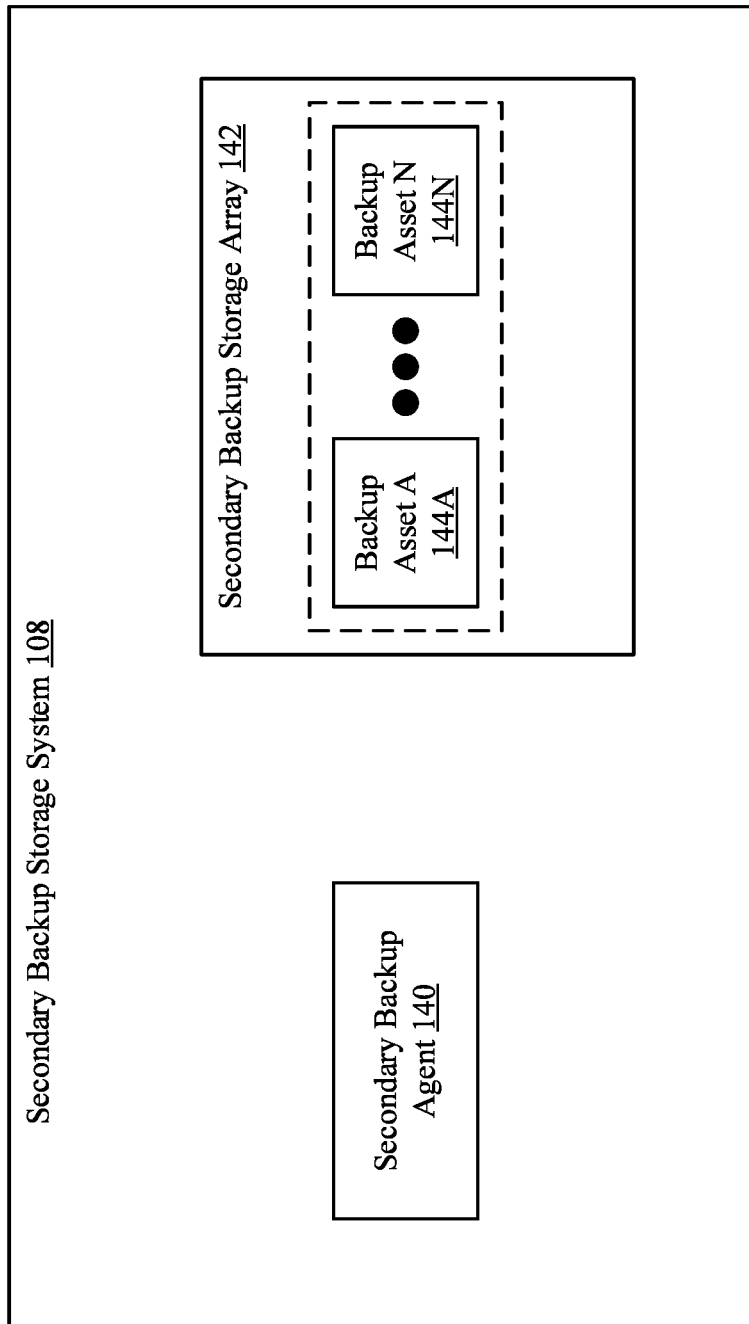
FIG. 1D shows a diagram of a secondary backup storage system in accordance with one or more embodiments of the invention.

FIG. 1D shows a secondary backup storage system in accordance with one or more embodiments of the invention. The secondary backup storage system (108) may include a secondary backup agent (140) and a secondary backup storage array (142). Each of these secondary backup storage system (106) components is described below.

In one embodiment of the invention, the secondary backup agent (140) may refer to a computer program that may execute on the underlying hardware of the secondary backup storage system (108). Specifically, the secondary backup agent (140) may be designed and configured to perform backup operations and restoration operations. To that extent, the secondary backup agent (140) may include functionality to perform a portion or all of the steps outlined below with respect to FIGS. 2, 3, 4, 6, and/or 7. One of ordinary skill will appreciate that the secondary backup agent (140) may perform other functionalities without departing from the scope of the invention.

In one embodiment of the invention, the secondary backup storage array (142) may refer to a collection of one or more physical storage devices (not shown) on which various forms of digital data—e.g., one or more backup assets (144A-144N) (described below)—may be consolidated. Each physical storage device may encompass non-transitory computer readable storage media on which data may be stored in whole or in part, and temporarily or permanently. Further, the physical storage devices may include non-volatile storage hardware, including (SSDs), hard disk drives (HDDs), tape-based storage, or any other storage that provides reliable and cost-effective long-term storage.

In one embodiment of the invention, a backup asset (144A-144N) may refer to a backup copy of a given asset (122A-122N) (see e.g., FIG. 1B) or a copy of a given backup asset (134A-134N) (see e.g., FIG. 1C). Accordingly, a backup asset (144A-144N) may similarly represent a database or a logical container to and from which related digital data, or any granularity thereof, may be stored and retrieved, respectively. A backup asset (144A-144N) may occupy a portion of a physical storage device or, alternatively, may span across multiple physical storage devices, of the secondary backup storage array (142). Furthermore, similar to an asset (122A-122N), a backup asset (144A-144N) may refer to a composite of various database objects including, but not limited to, one or more data files, one or more control files, and/or one or more redo log files (all described above).

While FIG. 1D shows a configuration of components, other secondary backup storage system (108) configurations may be used without departing from the scope of the invention.

Offloading Backup Operations

In previous implementations of backup operations, the client agent may be responsible for all steps of a backup operation. This may cause a significant burden on the client device, which may also take resources that may otherwise be used for applications on the client device. Further, performing backup operations may take a significant amount of time for the client device to perform. The method described in FIG. 2 may significantly reduce the amount of time that a backup operation takes by offloading portions of the backup operation from the client device to other components (e.g., 104, 106, 108) in the system (100).

Figure 2:
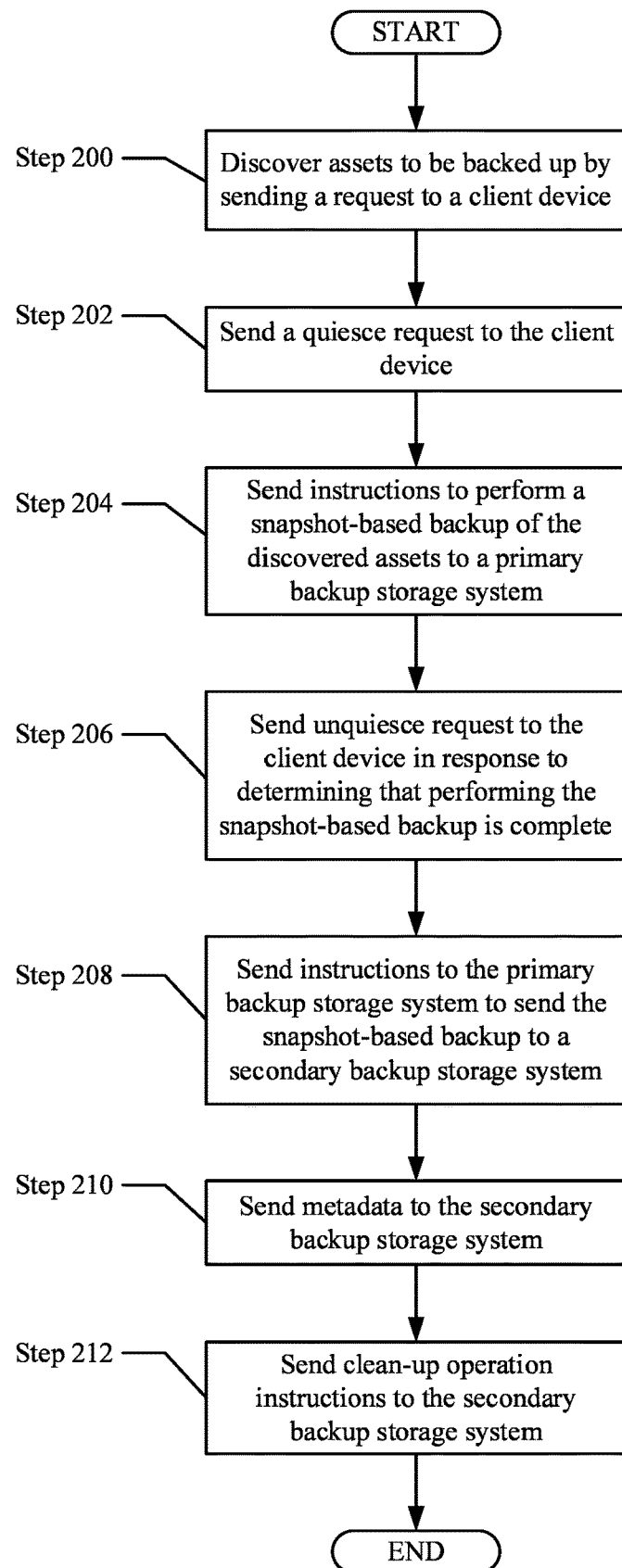
FIG. 2 shows a flowchart of a method for performing a backup operation accordance with one or more embodiments of the invention.

Turning to FIG. 2, FIG. 2 shows a flowchart describing a method for performing a snapshot-based backup in accordance with one or more embodiments disclosed herein.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

As discussed above, FIG. 2 shows a flowchart of a method for performing a snapshot-based backup, in accordance with one or more embodiments of the invention. The method may be performed by, for example, the data manager (104, FIG. 1A).

The method in FIG. 2 may start automatically based on a scheduled backup time or manually based on a user request. Further, the method may perform either a full backup or an archive log backup, which will be discussed in detail below.

In step 200, a data manager discovers assets to be backed up by sending a request to a client device (e.g., 102, FIG. 1B). In response to this request, a client agent (e.g., 110, FIG. 1B) and/or client storage array (e.g., 120, FIG. 1B) provides information to the data manager regarding the assets. For example, the information provided may include the metadata (e.g., control files and/or log files) associated with the assets. This information may inform the data manager which assets are to be backed up and how to retrieve the assets. Further, this metadata may be used in conjunction with the snapshot-based backup as described below.

In step 202, upon receipt of the information in step 200, the data manager sends a quiesce request to the client device. The quiesce request may include instructions such that the instructions only affect the assets discovered in step 200. The quiesce request includes instructions for the assets, and any associated portions of the client device, which may utilize the assets, to cease some or all of their functions. As part of these instructions, the assets will cease any functions that would cause the assets to change.

In step 204, the data manager sends, upon confirmation that the client device (or portion thereof is quiesced), instructions to perform a snapshot-based backup of the discovered assets to a primary backup storage system (e.g., 106, FIG. 1C). The instructions include the information received by the data manager from the client device in connection with discovering the assets in step 200. Based on these instructions, the primary backup storage system initiates a snapshot-based backup on the client device. The result of the initiation is the generation of a snapshot-based backup on the client device, which is then transferred to the primary backup storage system. This snapshot-based backup may include either a full backup, which is a backup of all assets on the client device, or a log backup, which is a backup of a portion of all assets on the client device. For example, in a log backup, the client device may include functionality to store any changes made to assets during operation in archive log volumes. Then, the log backup would backup only these archive log volumes generated by the client device.

The snapshot-based backup records the state of the assets at a point-in-time. The point-in-time may be the time at which the client device quiesces the relevant assets in response to the request sent in step 202. Alternatively, the point-in-time may be the time at which the snapshot is taken. The primary backup storage system records the point-in-time and includes it with the snapshot of the assets (e.g., as part of a metadata file associated with the snapshot).

In step 206, the data manager sends an unquiesce request to the client device in response to determining that snapshot-based backup is complete (i.e., a snapshot based backup has been generated and locally stored on the client device; however, when step 206 is performed, the client device may also be in the process of transferring the snapshot-based backup to the primary backup storage system). After the primary backup storage system completes the snapshot-based backup, the primary backup storage system informs the data manager of this completion. The unquiesce request includes instructions for the assets, and any associated portions of the client device, which may utilize the assets, to resume any functions that were ceased as part of the quiesce request. The client device receives this request and, in response, unquiesces the relevant assets.

In step 208, the data manager sends instructions to the primary backup storage system to send the snapshot-based backup (which at this point has been transferred from the client device to the primary backup storage system) to a secondary backup storage system (e.g., 108, FIG. 1D). In response to receiving the instructions, the primary backup storage system sends the snapshot-based backup to the secondary backup storage system. Sending the snapshot-based backup may utilize multiple data streams at one time to reduce the time of data transfer while also taking advantage of the flash storage of the primary backup storage system. Upon receiving the snapshot-based backup, the secondary backup storage may send an update to the data manager regarding information about the snapshot-based backup.

In step 210, the data manager sends metadata to the secondary backup storage system. As part of step 200, the data manager received, from the client device, metadata corresponding to the assets. This metadata may be utilized with the snapshot-based backup to provide additional information regarding the assets, which will be discussed below. The secondary backup storage system receives this metadata and combines the metadata with the snapshot-based backup to create a protection copy, which may be full protection copy or a log protection copy. A full protection copy may be produced as part of a full backup and a log protection copy may be produced as part of a log backup.

In step 212, the data manager sends clean-up operation instructions to the secondary backup storage system. The clean-up operation instructions may include instructions to delete files (e.g., temporary files, archive log files, etc.) that were generated as part of the aforementioned backup operations. In response to receiving the instructions, the secondary backup storage array performs the clean-up operation. In one or more embodiments, one or more archive log files are created during the backup operations and are subsequently subject to the clean-up operation. In such scenarios, when deleting the archive logs, the secondary backup storage system may first check the archive log to ensure that the archive log is not a newly created archive log (i.e., is an archive log that is not present in any previously made protection copy).

The method may end after step 212.

Hybrid Backup

Figure 3:
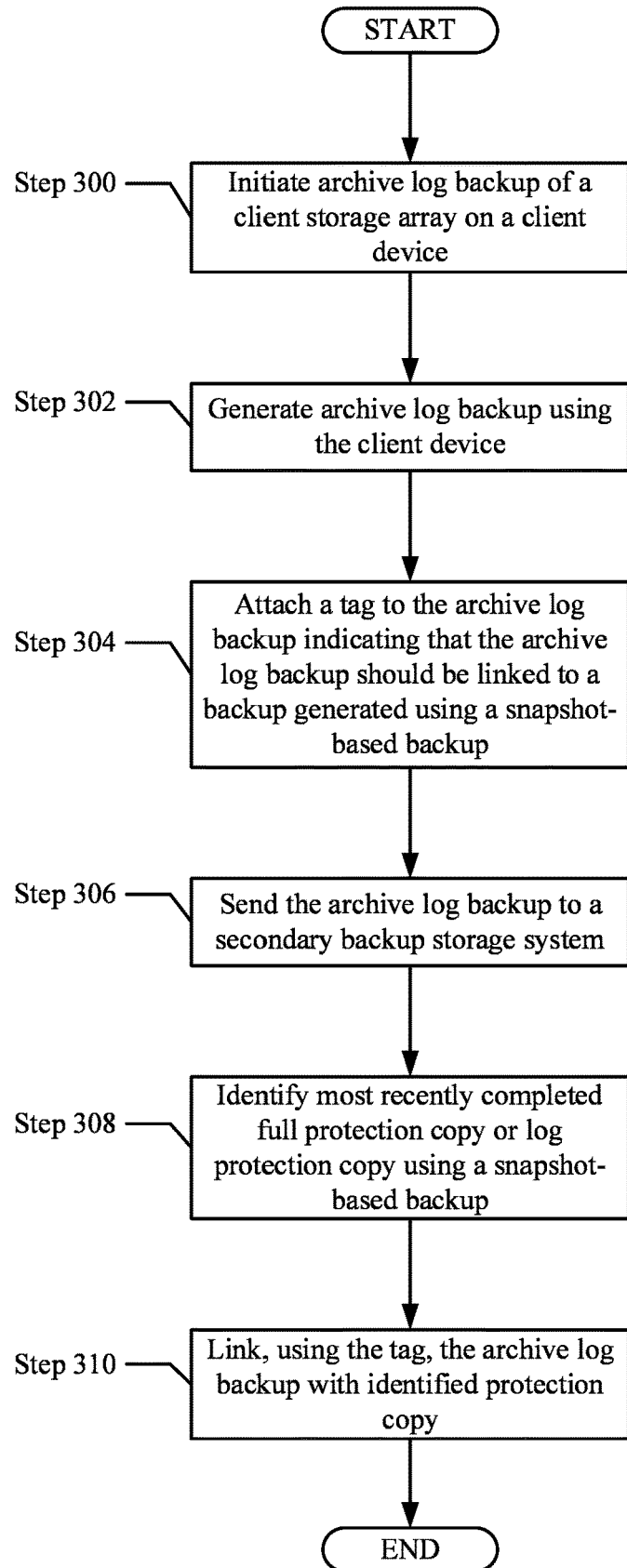
FIG. 3 shows a flowchart of a method for performing a backup operation in accordance with one or more embodiments of the invention.

While the snapshot-based backups provided for in FIG. 2 may provide many advantages, as discussed, users may still want to perform a stream-based backup for archive log backups while still receiving the advantages of snapshot-based backups for full backups. As such, the method provided for in FIG. 3 provides a method in which snapshot-based full backups can be used in conjunction with stream-based backups. This method may provide enhanced flexibility for users, better RPO and RTO, enable users to configure log files using the client device, and remove manual cataloguing of backups.

FIG. 3 shows a flowchart describing a method for enabling stream-based log backups to be used in conjunction with snapshot-based full backups in accordance with one or more embodiments disclosed herein.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

As discussed above, FIG. 3 shows a flowchart of a method for enabling stream-based log backups to be used in conjunction with snapshot-based full backups, in accordance with one or more embodiments of the invention. The method may be performed by, for example, the client agent (110, FIG. 1*i*), the secondary backup agent (140, FIG. 1D), and/or the data manager (104, FIG. 1A).

In step 300, the method initiates an archive log backup of a client storage array (e.g., 120, FIG. 1B) on a client device (e.g., 102, FIG. 1). Snapshot-based backup operations are provided for in FIG. 2 above. Initiating the archive log backup may be based on one or more parameters, including the time between each scheduled archive log backup, when the most recent backup operation occurred, a rate of change of assets on the client device, the overall size of the assets being backed up, or the amount of storage available on the client device.

As previously discussed, the client device may include functionality to generate full and log backups on its own. It may be useful to perform a snapshot-based backup (i.e., full and/or log backups) using the method in FIG. 2 and archive log backups using the functionality on the client device. However, the client device does not have the information relating to the snapshot-based backups and thus cannot, on its own, link archive log backups to a snapshot-based full backup.

Continuing with FIG. 3, in step 302, the client device (e.g., via the client agent) generates an archive log backup. This may be performed using the aforementioned RMAN, which may include functionality to detect new archive logs and generate backups of the archive logs. Generating a backup in this manner is considered a stream-based backup. The archive log backup may be generated using mechanisms/software other than RMAN without departing from the invention.

In step 304, a tag is attached to the archive log backup indicating that the archive log backup should be linked to a backup generated using a snapshot-based backup. The tag may be included as a separate file, as part of a metadata file corresponding to the archive log backup, or any other data structure used in connection with the archive log backup.

In step 306, the client device sends the archive log backup to a secondary backup storage system (e.g., 108, FIG. 1C).

In step 308, the secondary backup storage system identifies the most recently completed full protection copy or log protection copy using a snapshot-based backup. The identifying may be based on a point-in-time recorded during the snapshot-based backup operation, as discussed above. Further, it should be understood that the protection copy identified may include a full protection copy or a log protection copy.

In step 310, the secondary backup storage system links, using the tag on the archive log backup, the archive log backup with the protection copy identified in step 308. For example, the backups generated using a snapshot-based backup may include a second tag indicating that the backup was made using a snapshot-based backup operation. Thus, the data manager or a secondary backup agent (e.g., 140, 1D) may include logic that can identify the tag on the archive log backup sent by the client device and the second tag on the protection copy identified in step 308 and link the two together based on the tag and the second tag.

The method may end following step 310.

Dependency Chain Creation and Use

Figure 4:
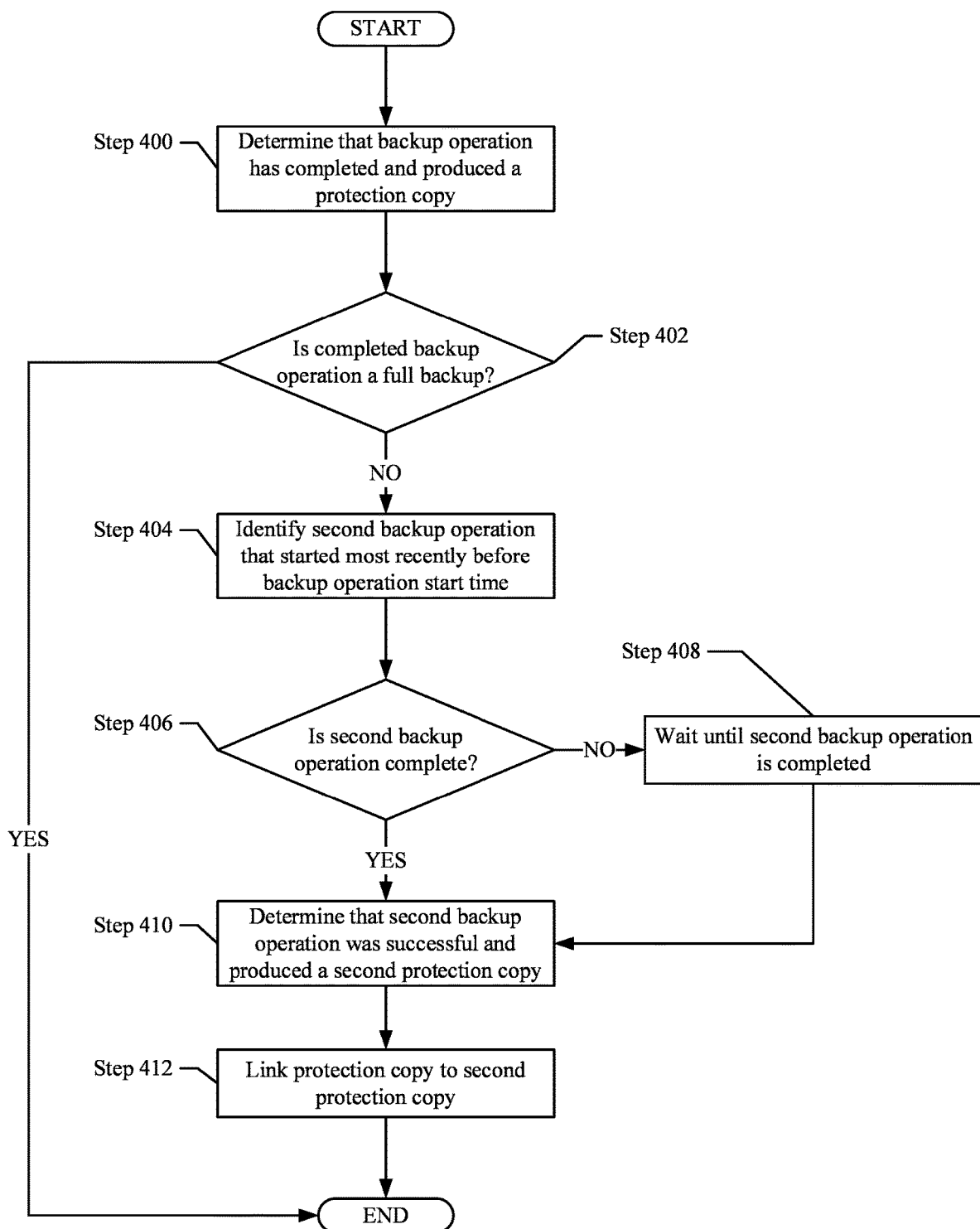
FIG. 4 shows a flowchart of a method for performing a backup operation in accordance with one or more embodiments of the invention.

FIG. 4 shows a flowchart describing a method for building a dependency chain of protection copies in accordance with one or more embodiments disclosed herein.

While the various steps in the flowchart shown in FIG. 4 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, the method of FIG. 4 may be performed upon the completion of the method FIG. 2, or as part of the method of FIG. 2.

As discussed above, FIG. 4 shows a flowchart of a method for building a dependency chain of protection copies, in accordance with one or more embodiments of the invention. The method may be performed by, for example, the data manager (104, FIG. 1A), the primary backup agent (130, FIG. 1C), and/or the secondary backup agent (140, FIG. 1D).

In previous implementations of chaining backups, the client device would initiate a restoration operation and then discover metadata corresponding to the different full and log backups. Then, the client device would determine the order of restoring the backups using the metadata and then perform the restoration operation based on this determined order. The method described in FIG. 4 may improve the linking of full backups and log backups by offloading the dependency chaining operation from the client device to other components (e.g., 104, 106, 108) in the system (100).

During a restoration operation, protection copies are used to restore the storage array to a particular time. Log protection copies cannot be used on their own to restore a storage array because the log protection copies only restore changes made to assets. As such, log protection copies are chained to full protection copies such that a restoration operation can restore a storage array using a full protection copy, and any intervening changes between the full protection copy and the desired restoration time using log protection copies that are linked to the full protection copy. However, using snapshot-based backup operations, the client device has no details regarding the protection copies. As such, the method described in FIG. 4 provides a method to appropriately chain log protection copies to full protection copies. Further, the method described in FIG. 4 builds the chain of protection copies upon their completion such that the information the chain provides is available at any time. Further, the method described in FIG. 4 may enable full backups and log backups to run simultaneously, providing greater flexibility when scheduling backups.

In step 400, the data manager and/or the secondary backup agent determines that a first snapshot-based backup operation has completed and a protection copy has been produced in connection with the backup operation. The snapshot-based backup is generated using the method shown in FIG. 2.

In step 402, the data manager and/or the secondary backup agent determines whether the protection copy is a full protection copy. If the protection copy is a full protection copy, then the full protection does not need to be linked to any other protection copies, because the full protection copy can be used on its own to perform a restoration operation. Upon determining that the protection copy is a full protection copy, the method may end. If the method determines that the protection copy is not a full protection copy, but rather is a log protection copy, the method may proceed to step 404.

In step 404, the data manager and/or the secondary backup agent identifies a second snapshot-based backup operation started most recently before the backup operation determined to have been completed in step 400. The second backup operation may be a full backup operation or a log backup operation. In one or more embodiments, different types of backup operations may take different lengths of time. For example, a full backup operation may take more time to complete than a log backup operation. However, as discussed above, the snapshot-based backups record assets at a point-in-time with the point-in-time being at the beginning of the backup operation (e.g., upon quiescing the assets). As such, the first backup operation may be linked to the second backup operation, as discussed below, even though the second backup operation is ongoing when the first backup operation is complete.

In step 406, the data manager and/or the secondary backup agent determines whether the second backup operation is complete. If the second backup operation is not complete the method proceeds to step 408. If the second backup operation is complete the method proceeds to step 410.

In step 408, the data manager and/or the secondary backup agent waits until the second backup operation is completed. Upon determining that the second backup operation is complete, the method may proceed to step 410.

In step 410, the data manager and/or the secondary backup agent determines that the second backup operation was successful and produced a second protection copy in connection with the second backup operation.

In step 412, the data manager and/or the secondary backup agent links the protection copy to the second protection copy. If the method determines that the second backup operation was not successful, the method identifies the next most recently successfully completed protection copy and link the protection copy to the next most recently successfully completed protection copy. Linking the protection copies includes generating linking metadata that links the protection copy to the second protection copy. This linking metadata may be used in a restoration operation, as discussed below. For example, when restoring data, a full protection copy may be used to restore data first, and the log protection copies may be used. However, the agent performing the restoration needs information that indicates what protection copy should be used next in the restoration process or that there are no further protection copies available for restoration. The linking metadata provides that information.

The method may end following step 412.

Example 1

FIGS. 5A-5F illustrate different timelines in which full backups and log backups may be completed and FIG. 4 provides a method for how these backups would be chained. While FIGS. 5A-5F provide six different example timelines, these examples are not intended to be an exhaustive list of possible timelines. For ease of understanding, each timeline includes four sequential events that may be referred to as t1, t2, t3, and t4 in that order. For the purposes of these examples, it is assumed that the log backup always successfully completes.

Figure 5A:
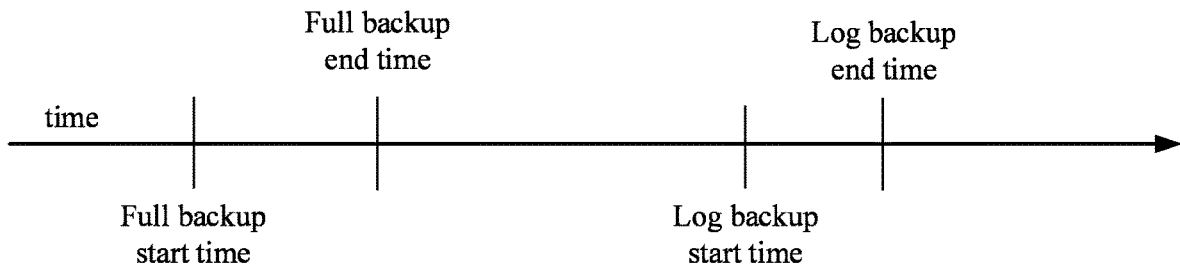
FIGS. 5A-5F each shows an example of a timeline of backups in accordance with one or more embodiments of the invention.

FIG. 5A shows a timeline in which a full backup starts at t1 and successfully ends at t2. Then, a log backup starts at t3 and ends at t4. In this example, the full backup ends before the log backup starts, and the method of FIG. 4 would link the log backup to the full backup.

Figure 5B:
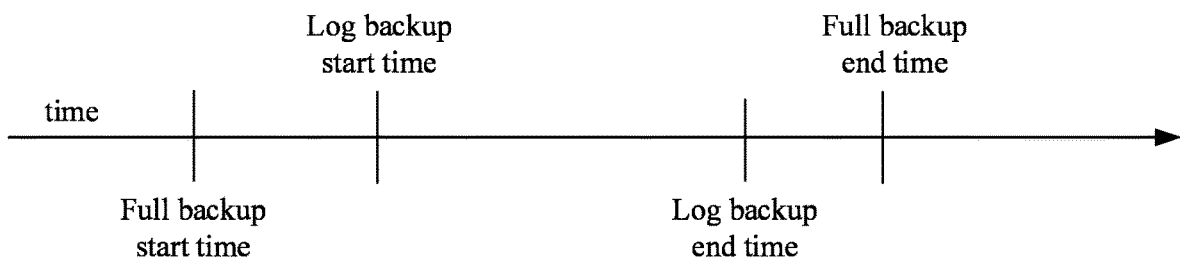

FIG. 5B shows a timeline in which a full backup starts at t1 and successfully ends at t4. The log backup starts at t2 and ends at t3. Using the method of FIG. 4, the method would determine that the full backup is not complete and would wait until at least t4. Then, the method would determine that the full backup successfully completed and link the log backup to the full backup.

Figure 5C:
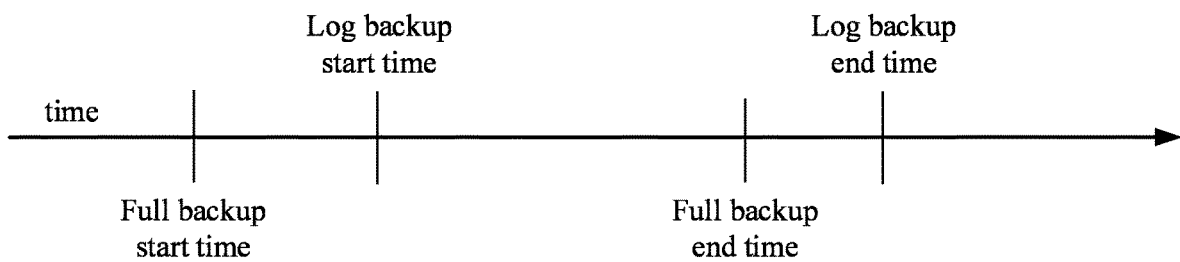

FIG. 5C shows a timeline in which a full backup starts at t1 and successfully ends at t3. The log backup starts at t2 and ends at t4. Using the method of FIG. 4, the method would determine that the full backup has successfully ended and would not wait and would link the full backup to the log backup.

Figure 5D:
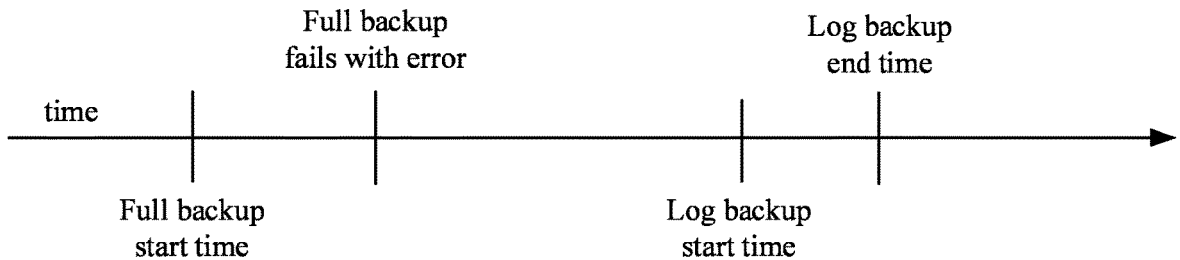

FIG. 5D shows a timeline in which a full backup starts at t1 and fails with an error at t2. The log backup starts at t3 and ends at t4. Using the method of FIG. 4, the method would determine that the full backup shown has failed its backup and is thus unavailable for linking. The method would then identify next most recently successfully completed backup, whether that backup is a log backup or full backup, and link the shown log backup to the identified next most recently successfully completed backup.

Figure 5E:
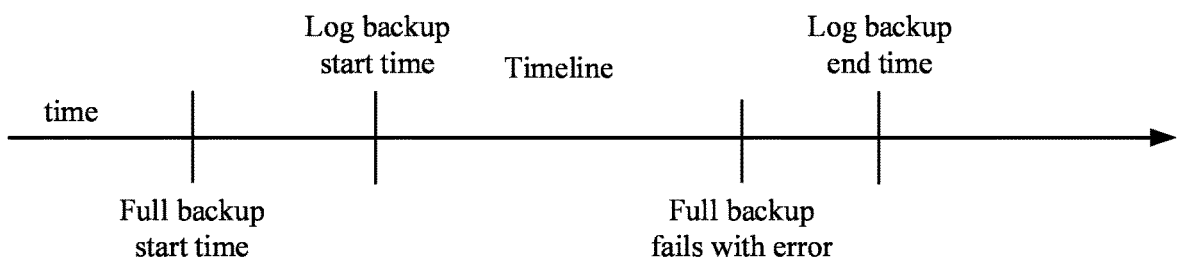

FIG. 5E shows a timeline in which a full backup starts at t1 and fails with an error at t3. The log backup starts at t2 and ends at t4. Using the method of FIG. 4, the method would determine that the full backup shown has failed its backup and is thus unavailable for linking. The method would then identify the next most recent successfully completed backup, whether that backup is a log backup or a full backup, and link the shown log backup to the identified next most recently successfully completed backup.

Figure 5F:
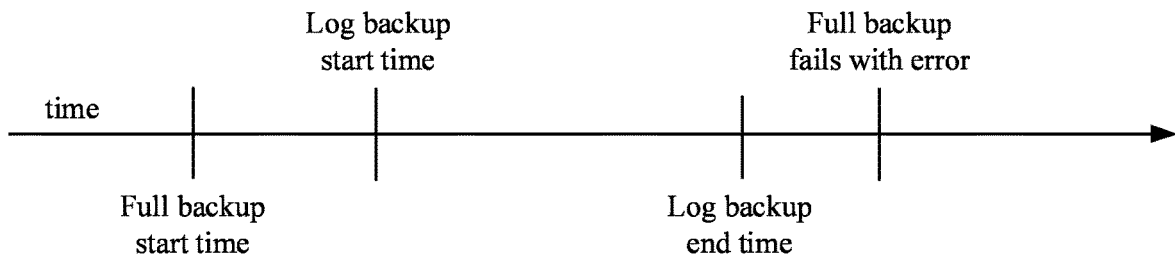

FIG. 5F shows a timeline in which a full backup starts at t1 and fails with an error at t4. The log backup starts at t2 and ends at t3. Using the method of FIG. 4, the method would determine that the full backup is not complete and would wait until at least t4. Then, the method would determine that the full backup has failed its backup and is thus unavailable for linking. The method would then identify the next most recent successfully completed backup, whether that backup is a log backup or a full backup, and link the shown log backup to the identified next most recently successfully completed backup.

End Example 1

Restoration

Figure 6:
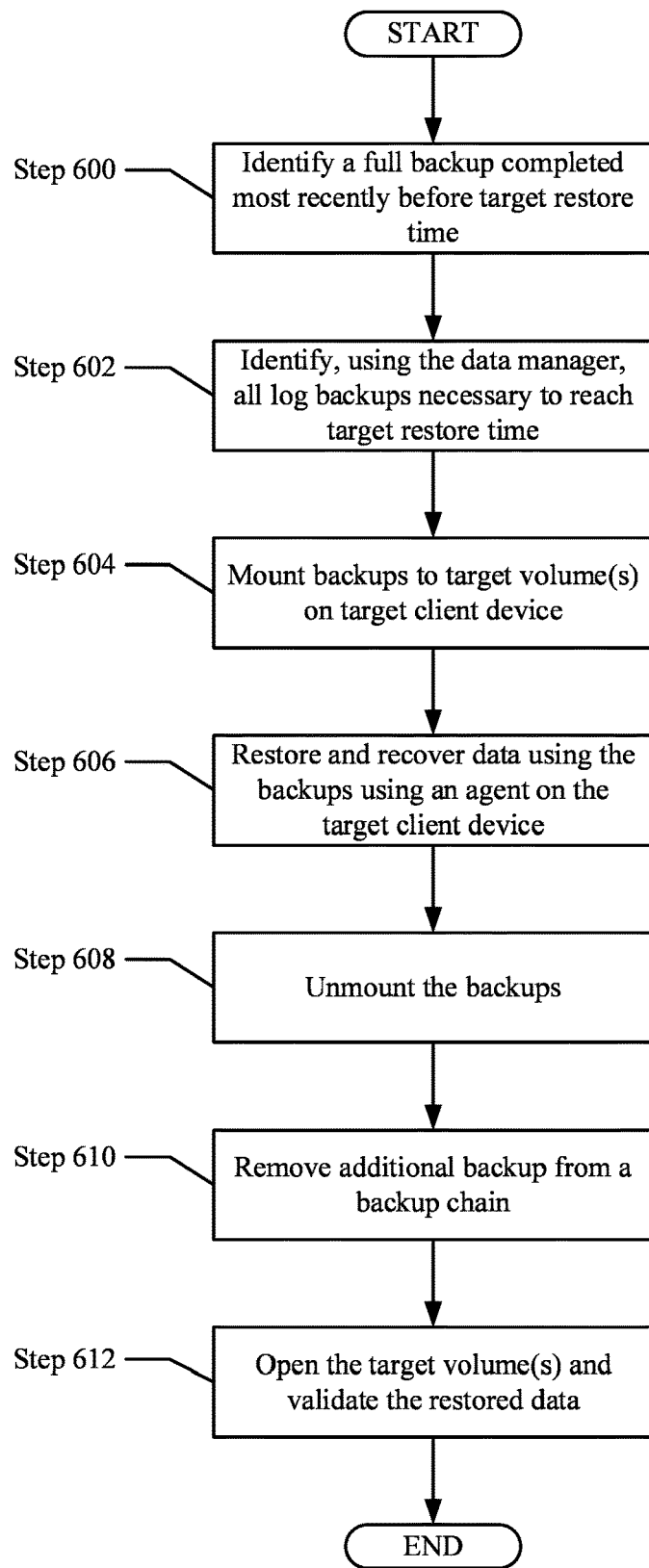
FIG. 6 shows a flowchart of a method for performing a restoration operation in accordance with one or more embodiments of the invention.

FIG. 6 shows a flowchart describing a method for a restoration operation in accordance with one or more embodiments disclosed herein.

While the various steps in the flowchart shown in FIG. 6 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

As discussed above, FIG. 6 shows a flowchart of a method for a restoration operation, in accordance with one or more embodiments of the invention. The method may be performed by, for example, the data manager (104, FIG. 1A), the primary backup agent (130, FIG. 1C), the secondary backup agent (140, FIG. 1D), and/or the client agent (110, FIG. 1A).

As discussed above, the snapshot-based backups are performed in such a manner that the client device has no information about the backups. As such, the client device cannot perform a restoration operation on its own. However, as discussed above, the client device does include functionality to perform a portion of the restoration operations by, for example, using RMAN. Further, there may be a gap between the last log backup in a chain of backups, as provided for in FIG. 4, and the next full backup. Thus, a restoration process may be unable to restore the data to a state in this in-between period. The method of FIG. 6 provides a way for a restoration process to restore the data to a time in this in-between period. For clarity, and example is provided below in reference to FIG. 8.

In step 600, the data manager identifies a full backup (i.e., a full protection copy) completed most recently before the target restore time. When performing a restoration operation, a user may provide the target restore time. The target restoration time corresponds to a time to which the user desires the state of the data to return.

In step 602, the data manager identifies all backups necessary to reach the target restore time. For example, if the target restore time is after a first log backup but before a second log backup, the method will identify the second log backup, even if the second log backup is chained to a different full backup than the first log backup. In this manner, the method may restore the data to a time that is between the last log backup of a chain and a following full backup, which is the start of a new chain.

In step 604, the data manager and/or the secondary backup agent mounts the backups to one or more target volumes on a target client device. The target client device may be the same client device that produced the assets present in the backups. Mounting may also include restoring any control files or log files corresponding to the backups to the client device. Further, mounting may include providing the chain information to the client device, including the client agent, to inform the client device of which backups are available and how they are linked together. In addition, in situations where a log backup from a separate full backup chain is needed, as described above, the mounting may include adding the additional log backup to the chain. This may be performed by simply linking the additional log backup to the last log backup.

In step 606, the client agent restores and recovers data using the backups provided to the client agent in step 604. For example, the client agent may utilize RMAN to perform step 606; other native client restoration mechanisms may be used without departing from the invention.

In step 608, the data manager and/or the secondary backup agent unmounts the backups that were mounted in step 604. After completion of step 604, the client device no longer has a need for the backups to be mounted locally on the client device, so they may be unmounted.

In step 610, the data manager and/or the secondary backup agent removes the additional log backup from the backup chain. As described above, an additional log backup from one chain of backups may be linked to another chain of backups in certain circumstances. In step 610, this additional log backup is removed from the backup chain that was used in the present restoration operation.

In step 612, the method opens the one or more target volumes and validates the restored data. If the data is determined to be not valid, the method may start over.

The method may end upon determining that the restored data is valid in step 612.

Figure 7:
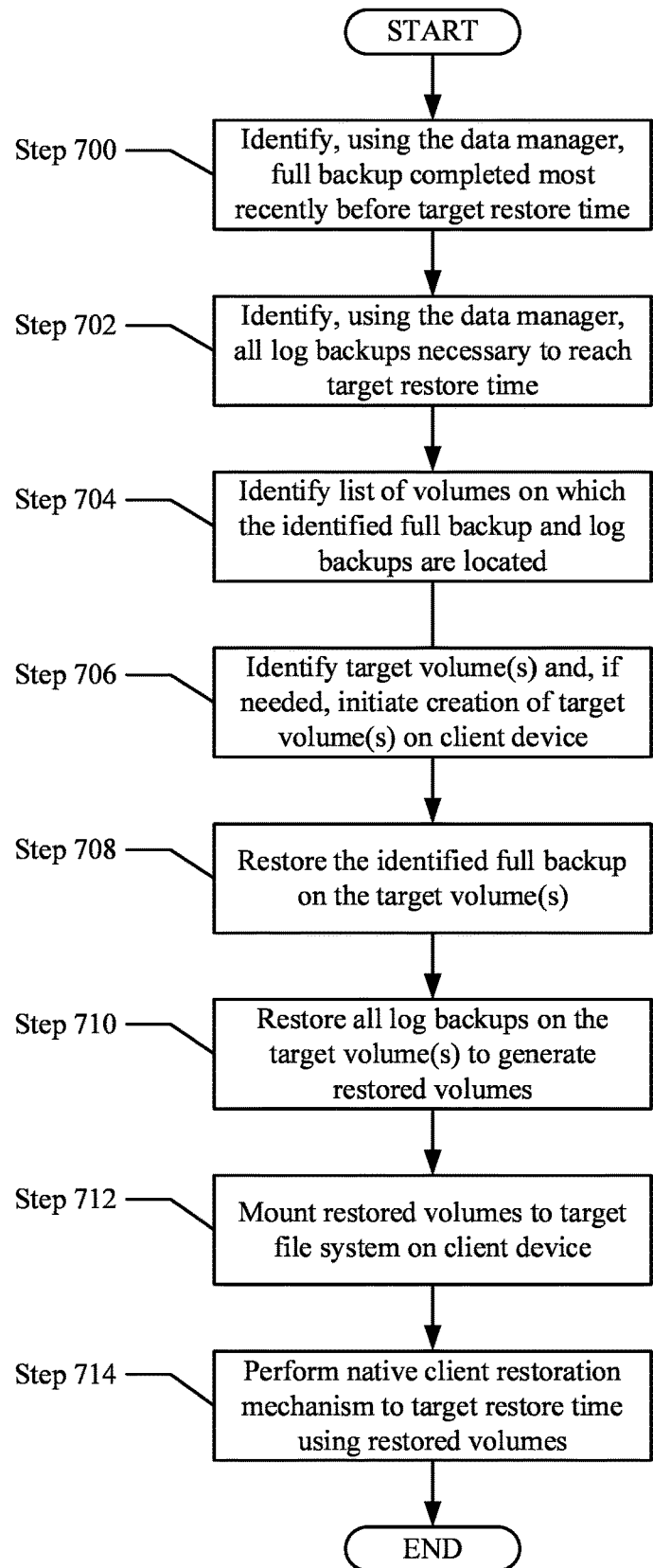
FIG. 7 shows a flowchart of a method for performing a restoration operation in accordance with one or more embodiments of the invention.

FIG. 7 shows a flowchart describing a method for a disaster restoration operation in accordance with one or more embodiments disclosed herein.

While the various steps in the flowchart shown in FIG. 7 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

As discussed above, FIG. 7 shows a flowchart of a method for a disaster restoration operation, in accordance with one or more embodiments of the invention. The method may be performed by, for example, the data manager (104, FIG. 1A), the primary backup agent (130, FIG. 1C), the secondary backup agent (140, FIG. 1D), and/or the client agent (110, FIG. 1A).

As discussed above, the snapshot-based backups are performed in a manner such that the client device has no information about the backups. As such, the client device cannot perform a restoration operation on its own. However, as discussed above, the client device does include functionality to perform a portion of the restoration operations by, for example, using RMAN. Further, there may be a gap between the last log backup in a chain of backups, as provided for in FIG. 4, and the next full backup. Thus, a restoration process may be unable to restore the data to a state in this in-between period. The method of FIG. 7 provides a way for a restoration process to restore the data to a time in this in-between period. For clarity, and example is provided below in reference to FIG. 8.

Further, because the snapshot-based backups are stored on the secondary backup storage system, the snapshot-based backups may be used to provide a restoration operation to any one of the client devices rather than just the client device that produced the assets present in the backups.

In step 700, the data manager and/or the secondary backup agent identifies a full backup completed most recently before the target restore time. When performing a restoration operation, a user may provide, via an input, the target restore time, which is the time at which the user desires the state of the data to return to.

In step 702, the data manager and/or the secondary backup agent identifies all backups necessary to reach the target restore time. For example, if the target restore time is after a first log backup and before a second log backup, the method will identify the second log backup, even if the second log backup is chained to a different full backup than the first log backup. In this manner, the method may restore the data to a time that is between the last log backup of a chain and a following full backup, which is the start of a new chain. Further, this second log backup may be considered to encompass the target restore time.

In step 704, the data manager and/or the secondary backup agent identifies a list of volumes on which the identified full backup and log backups are located. Because the backups are not treated as a single file, they may be located across different volumes. Thus, to send the backups to another device, the volumes on which they are located must be identified.

In step 706, the data manager and/or the secondary backup agent identifies one or more target volumes and, if the target volumes do not yet exist, the method initiates the creation of the target volumes to provide a location onto which the backups may be restored.

In step 708, the data manager and/or the secondary backup agent restores the identified full backup onto the one or more target volumes and then, in step 710, restores all of the identified log backups onto the one or more target volumes to generate one or more restored volumes. The order that the log backups are restores is based on a start time of each of the log backups. For example, log backups generated earlier are restored before log backups that restored later. Performing steps 708 and 710 generates a volume that may be used by the client device, which may not have the protocols necessary to perform a restoration using a snapshot-based backup.

In step 712, the data manager and/or the secondary backup agent mounts the restored volumes to a target file system on a target client device. The target client device may include the same client device that produced the assets in the backups, or the target client device may include any other and any number of client devices. Mounting the restored volumes may also include restoring a spfile from the identified full backup and control files from one or more of the identified log backups. In one or more embodiments, the spfile includes server parameter information, which provides information to the client agent to initialize a database, which may be needed to perform a restoration operation.

In step 714, the client agent performs a native client restoration mechanism to the target restore time using the one or more restored volumes generated in step 710. The native client restoration mechanism may include, for example, RMAN. Thus, the snapshot-based backups may be used in conjunction with systems that do not produce snapshot-based backups and cannot use snapshot-based backups to perform restoration operations.

The method may end after step 714.

Example 2

Figure 8:
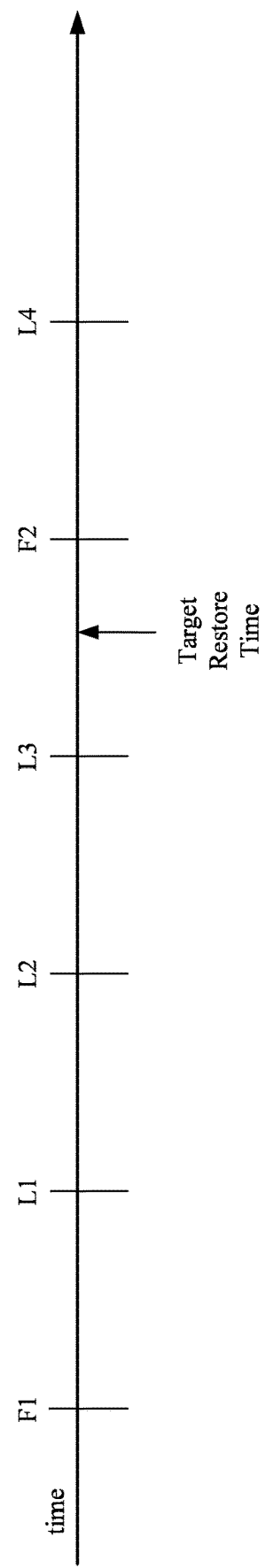
FIG. 8 shows an example of a timeline of backups in accordance with one or more embodiments of the invention.

FIG. 8 shows an example timeline in order to better understand certain circumstances encountered in the methods of FIGS. 6 and 7. It should be understood that FIG. 8 provides only one example of a specific set of circumstances, and that the methods of FIGS. 6 and 7 may apply to other circumstances. FIG. 8 shows a first full backup, F1, happening at t1, a first log backup, L1, happening at t2, a second log backup, L2, happening at t3, a third log backup, L3, happening at t4, a target restore time at t5, a second full backup, F2, happening at t6, and a fourth log backup, L4, happening at t7. Further, t1, t2, t3, t4, t5, t6, and t7 occur sequentially.

Using the method of FIG. 4, L1 is linked to F1, L2 is linked to L1, and L3 is linked to L2, which completes the first chain of backups. Then, L4 is linked to F2, which completes the second chain of backups, and the first and second chain is separate from one another. However, the target restore time is at a time between L3 and F2. Thus, restoring to F2 would include changes made between the target restore time and F2 and restoring to L3 would not include changes made between L3 and the target restore time. As such, the methods described in FIGS. 6 and 7 link, for purposes of a restoration operation, L4 to L3.

Then, according the method described in FIG. 7, the following occurs. The data manager and/or the secondary backup agent identifies the volumes on which F1, L1, L2, L3, and L4 are located. Then, the data manager and/or the secondary backup agent identifies one or more target volumes onto which F1, L1, L2, L3, and L4 are to be restored onto. The, the data manager and/or the secondary backup agent restores F1, L1, L2, L3, and L4 to the target volumes, which produces restored volumes. Then, the data manager and/or the secondary backup agent mounts the restored volumes to a target file system on a target client device. Then, the client agent performs a native client restoration mechanism to restore the data contained within F1, L1, L2, L3, and L4.

End Example 2

As discussed above, embodiments of the invention may be implemented using computing devices. FIG. 9 shows a diagram of a computing device in accordance with one or more embodiments of the invention. The computing device (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), input devices (910), output devices (908), and numerous other elements (not shown) and functionalities. Each of these components is described below.

In one embodiment of the invention, the computer processor(s) (902) may be an integrated circuit for processing instructions. For example, the computer processor(s) may be one or more cores or micro-cores of a processor. The computing device (900) may also include one or more input devices (910), such as a touchscreen, keyboard, mouse, microphone, touchpad, electronic pen, or any other type of input device. Further, the communication interface (912) may include an integrated circuit for connecting the computing device (900) to a network (not shown) (e.g., a local area network (LAN), a wide area network (WAN) such as the Internet, mobile network, or any other type of network) and/or to another device, such as another computing device.

In one embodiment of the invention, the computing device (900) may include one or more output devices (908), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many diverse types of computing devices exist, and the aforementioned input and output device(s) may take other forms.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for performing a restore operation, the method comprising:
   identifying a first full backup associated with a first client device most recently prior to a target restore time;
   identifying a set of log backups, the set of log backups comprising:
      a first log backup that is most recently after the target restore time, wherein the first log backup is linked to a second full backup, and wherein the second full backup was performed after the target restore time, and
      all log backups between the first full backup and the first log backup, wherein the all log backups are linked to the first full backup and each of the all log backups was performed prior to the target restore time;
   identifying a target volume to which the first full backup and the set of log backups are to be restored, wherein the target volume is on a second client device separate from the first client device;
   restoring the first full backup and the set of log backups to the target volume;
   mounting, after the restoring, the target volume to a target file system; and
   performing a native client restoration mechanism to the target restore time using the target file system.

2. The method of claim 1, wherein the target volume comprises at least two different volumes.

3. The method of claim 1, further comprising:
   restoring a spfile from the first full backup and a control file from the first log backup.

4. The method of claim 3, further comprising:
   creating the target volume; and
   attaching the target volume to the second client device.

5. The method of claim 1, wherein the target restore time is provided by a user input.

6. The method of claim 1, further comprising:
   determining, after mounting the target volume, that the restore operation was successful.

7. The method of claim 1, wherein the native client restoration mechanism comprises Recovery Manager (RMAN).

8. The method of claim 1, wherein the first log backup comprises changes made to one or more assets from a first time, before the target restore time, to a second time, after the target restore time.

9. A system comprising:
   a backup storage system comprising a memory; and
   a processor comprising instructions configured to:
      identify a first full backup associated with a first client device nearest most recently prior to a target restore time;
      identify a set of log backups, the set of log backups comprising:
         a first log backup that is most recently after the target restore time, wherein the first log backup is linked to a second full backup, and wherein the second full backup was performed after the target restore time, and
         all log backups between the first full backup and the first log backup, wherein the all log backups are linked to the first full backup and each of the all log backups was performed prior to the target restore time;
      identify a target volume to which the first full backup and the set of log backups are to be restored, wherein the target volume is on a second client device separate from the first client device;
      restore the first full backup and the set of log backups to the target volume; and
      mount, after the restoring, the target volume to a target file system; and
   the second client device operatively connected to the backup storage system, wherein the client device comprises:
      a client memory; and
      a client processor configured to:
         perform a native client restoration mechanism to the target restore time using the target file system.

10. The system of claim 9, wherein the target volume comprises at least two different volumes.

11. The system of claim 9, wherein the processor is further configured to:
    restore a spfile from the first full backup and a control file from the log backup.

12. The system of claim 9, wherein the processor is further configured to:
    create the target volume; and
    attach the target volume to the second client device.

13. The system of claim 9, wherein the target restore time is provided by a user input.

14. The system of claim 9, wherein the processor is further configured to:
    determine, after mounting the target volume, that the restore operation was successful.

15. The system of claim 9, wherein the native client restoration mechanism comprises Recovery Manager (RMAN).

16. The system of claim 9, wherein the first log backup comprises changes made to one or more assets from a first time, before the target restore time, to a second time, after the target restore time.

17. A method for performing a restore operation, the method comprising:
    identifying a first full backup associated with a first client device most recently prior to a target restore time;
    identifying a set of log backups, the set of log backups comprising:
       a first log backup that is most recently after the target restore time, wherein the first log backup is linked to a second full backup, and wherein the second full backup was performed after the target restore time, and all log backups between the first full backup and the first log backup, wherein the all log backups are linked to the first full backup and each of the all log backups was performed prior to the target restore time;

identifying a target volume to which the first full backup and the set of log backups are to be restored, wherein the target volume is on a second client device separate from the first client device;

restoring the full backup and the set of log backups to the target volume;

mounting, after the restoring, the target volume to a target file system; and performing a native client restoration mechanism to the target restore time using the target file system, wherein the native client restoration mechanism comprises Recovery Manager (RMAN).

* * * * *